US010885888B2

(12) United States Patent
May

(10) Patent No.: US 10,885,888 B2
(45) Date of Patent: Jan. 5, 2021

(54) MECHANICAL ASSIST EQUIPMENT SUPPORT STAND

(71) Applicant: Randall L. May, Irvine, CA (US)

(72) Inventor: Randall L. May, Irvine, CA (US)

(73) Assignee: RANDALL MAY INTERNATIONAL INCORPORATED, Irvine, CA (US)

(*) Notice: Subject to any disclaimer, the term of this patent is extended or adjusted under 35 U.S.C. 154(b) by 0 days.

(21) Appl. No.: 15/874,394

(22) Filed: Jan. 18, 2018

(65) Prior Publication Data

US 2018/0144727 A1   May 24, 2018

Related U.S. Application Data

(63) Continuation of application No. 15/169,147, filed on May 31, 2016, now Pat. No. 9,881,595, which is a (Continued)

(51) Int. Cl.
| | |
|---|---|
| *F16M 11/00* | (2006.01) |
| *G10G 5/00* | (2006.01) |
| *F16M 11/20* | (2006.01) |
| *F16M 11/32* | (2006.01) |
| *A47B 19/00* | (2006.01) |
| *F16M 11/24* | (2006.01) |
| *F16M 11/28* | (2006.01) |
| *F16M 11/18* | (2006.01) |
| *F16M 11/34* | (2006.01) |
| *H04R 1/02* | (2006.01) |

(52) U.S. Cl.
CPC .......... *G10G 5/005* (2013.01); *A47B 19/002* (2013.01); *F16M 11/18* (2013.01); *F16M 11/2021* (2013.01); *F16M 11/245* (2013.01); *F16M 11/28* (2013.01); *F16M 11/32* (2013.01); *F16M 11/34* (2013.01); *G10G 5/00* (2013.01); *H04R 1/02* (2013.01)

(58) Field of Classification Search
CPC ........ H04R 1/026; H04R 1/083; H04R 1/345; G10G 55/00; F16M 11/28; F16M 11/16; F16M 11/046
USPC ....... 83/387 AM, 387 R, 453, 327, 329, 290
See application file for complete search history.

(56) References Cited

U.S. PATENT DOCUMENTS

| | | | | |
|---|---|---|---|---|
| 1,570,168 A | * | 1/1926 | Mortensen | G10G 5/00 |
| | | | | 211/85.6 |
| 1,646,165 A | * | 10/1927 | Naujoks et al. | F16M 11/42 |
| | | | | 248/125.8 |

(Continued)

*Primary Examiner* — Shin H Kim
(74) *Attorney, Agent, or Firm* — Crowell & Moring LLP

(57) ABSTRACT

Improvements in a tilting, lifting stand are presented. The tilt, lift stand is for a musical instrument stand or to elevate/tilt a speaker and or amplifier and rigidly supports a sousaphone brass type instruments, speaker or amplifier in an in a stored and in a playable or elevated position. The stand supports all or the majority of the weight of the instrument or speaker or amplifier in a static position to relieve the weight of the musical instrument or speaker or amplifier. The stand has legs that are extendable to rest on multiple levels as might be found in a stadium. The stand further has a securing mechanism that gently grasps a tubular section to hold the musical instrument. The speaker stand can be easily collapsed for transportation and storage.

16 Claims, 9 Drawing Sheets

Related U.S. Application Data continuation of application No. 14/598,162, filed on Jan. 15, 2015, now Pat. No. 9,377,158.

(60) Provisional application No. 61/927,863, filed on Jan. 15, 2014.

(56) References Cited

U.S. PATENT DOCUMENTS

| | | | | |
|---|---|---|---|---|
| 1,653,772 A * | 12/1927 | Knoche | | G10G 5/00 248/122.1 |
| 1,907,238 A * | 5/1933 | Blondin | | G10G 5/00 84/327 |
| 2,575,540 A * | 11/1951 | Wenger | | A47C 9/08 297/16.1 |
| 3,024,690 A * | 3/1962 | Sanstead | | G10G 5/00 248/161 |
| 3,193,325 A * | 7/1965 | Wenger | | A47C 9/08 248/201 |
| 3,259,428 A * | 7/1966 | Wenger | | A47C 9/08 211/85.6 |
| 3,266,766 A * | 8/1966 | Linville, Jr. | | G10G 5/00 248/688 |
| 3,307,814 A * | 3/1967 | Bogar, Jr. | | F16M 11/046 248/188.2 |
| 3,664,224 A * | 5/1972 | Campagna, Jr. | | G10G 5/00 248/230.8 |
| 3,811,357 A | 5/1974 | Stewart | | |
| 4,065,994 A | 1/1978 | Streit | | |
| 4,067,527 A | 1/1978 | Streit | | |
| 4,183,317 A * | 1/1980 | Follick | | E01F 13/02 116/63 P |
| 5,050,827 A * | 9/1991 | Christie | | G10G 5/00 248/125.1 |
| 5,072,910 A * | 12/1991 | May | | F16M 11/28 248/170 |
| 5,375,497 A * | 12/1994 | Pirchio | | G10G 5/00 248/443 |
| 5,542,371 A * | 8/1996 | Harvey | | B63B 17/00 114/363 |
| 5,789,687 A | 8/1998 | Johnson | | |
| 6,007,032 A * | 12/1999 | Kuo | | F16M 11/10 248/125.1 |
| 6,491,266 B1 * | 12/2002 | Chen | | F16M 11/16 248/163.1 |
| 6,622,981 B1 * | 9/2003 | Hsieh | | F16M 11/28 248/291.1 |
| 6,643,966 B2 * | 11/2003 | Schmitt | | G09F 15/0025 40/604 |
| 6,685,145 B2 * | 2/2004 | Mackay | | A47F 5/02 248/125.1 |
| 6,695,268 B1 * | 2/2004 | Hsieh | | A47B 19/002 248/188.7 |
| 6,857,607 B1 * | 2/2005 | Burris | | G09F 15/0025 248/164 |
| 6,967,271 B1 * | 11/2005 | Schaff | | G10D 13/00 84/327 |
| 7,011,280 B2 * | 3/2006 | Murray | | F16M 11/041 248/171 |
| 7,296,653 B1 * | 11/2007 | Smith, Jr. | | H04R 1/026 181/155 |
| 7,438,266 B2 * | 10/2008 | May | | F16M 11/34 248/163.1 |
| 7,514,619 B1 * | 4/2009 | Bruce | | A47B 81/00 100/100 |
| 7,560,633 B1 * | 7/2009 | Wang | | G10D 13/026 84/421 |
| 7,588,228 B2 * | 9/2009 | May | | G10D 13/026 248/165 |
| 7,588,288 B2 | 9/2009 | May | | |
| 7,703,725 B2 * | 4/2010 | May | | G10D 13/026 248/163.1 |
| 7,718,878 B2 | 5/2010 | May | | |
| 8,490,942 B1 * | 7/2013 | Henry | | G10G 5/00 206/314 |
| 8,633,365 B2 * | 1/2014 | May | | G10D 13/026 84/387 A |
| 9,863,573 B2 * | 1/2018 | May | | F16M 11/245 |
| 2003/0173473 A1 * | 9/2003 | MacKay | | A47F 5/02 248/125.7 |
| 2003/0173484 A1 * | 9/2003 | Hsieh | | F16M 11/28 248/291.1 |
| 2005/0045786 A1 * | 3/2005 | Tupper | | A01G 9/12 248/229.2 |
| 2005/0092878 A1 * | 5/2005 | Murray | | F16M 11/041 248/171 |
| 2005/0150357 A1 * | 7/2005 | Tanaka | | G10D 13/065 84/422.3 |
| 2006/0049319 A1 * | 3/2006 | May | | G10D 13/026 248/166 |
| 2006/0086869 A1 * | 4/2006 | Hsieh | | F16M 11/046 248/171 |
| 2006/0162529 A1 * | 7/2006 | Hsieh | | F16M 11/16 84/327 |
| 2006/0175523 A1 * | 8/2006 | Tai | | A47B 19/002 248/460 |
| 2007/0235603 A1 * | 10/2007 | Ryan | | H04R 1/08 248/161 |
| 2008/0048074 A1 * | 2/2008 | May | | F16M 11/34 248/176.1 |
| 2008/0061195 A1 * | 3/2008 | Carnevali | | F16M 11/14 248/125.8 |
| 2008/0135697 A1 * | 6/2008 | Workman | | F16M 11/16 248/177.1 |
| 2008/0179266 A1 * | 7/2008 | Mori | | G10D 13/026 211/85.6 |
| 2009/0184074 A1 | 7/2009 | Jacobson | | |
| 2010/0163693 A1 * | 7/2010 | Wang | | G10G 5/00 248/121 |
| 2011/0303804 A1 * | 12/2011 | Rodrigues | | G10G 5/00 248/122.1 |
| 2012/0144974 A1 * | 6/2012 | May | | G10D 13/026 84/387 A |
| 2013/0243231 A1 * | 9/2013 | Parraga Gimeno | | H04R 5/02 381/332 |
| 2014/0117173 A1 * | 5/2014 | Liaw | | G10G 5/00 248/125.8 |
| 2015/0267859 A1 * | 9/2015 | Carpenter | | F16M 11/24 248/411 |
| 2016/0091134 A1 * | 3/2016 | May | | F16M 11/28 248/404 |

* cited by examiner

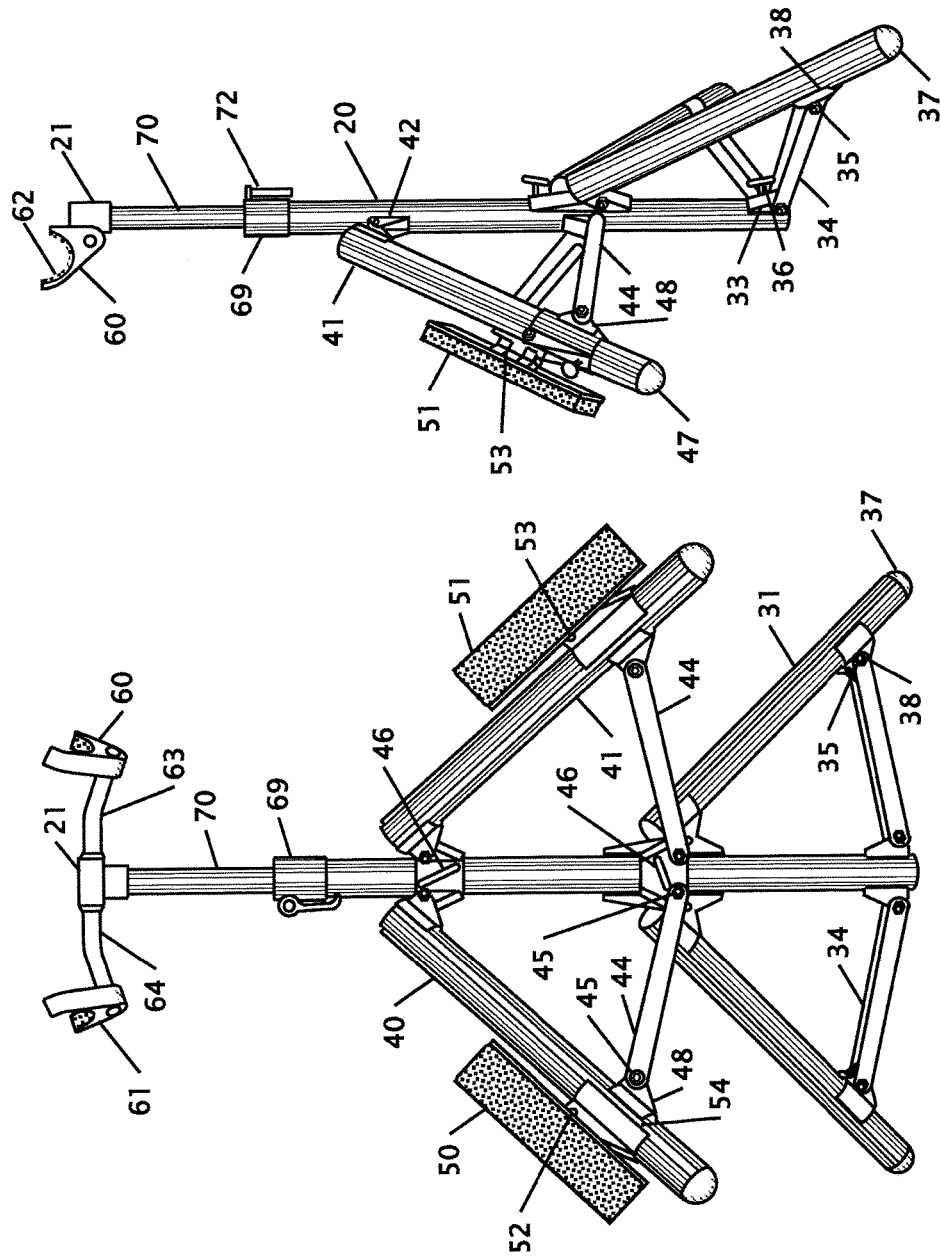

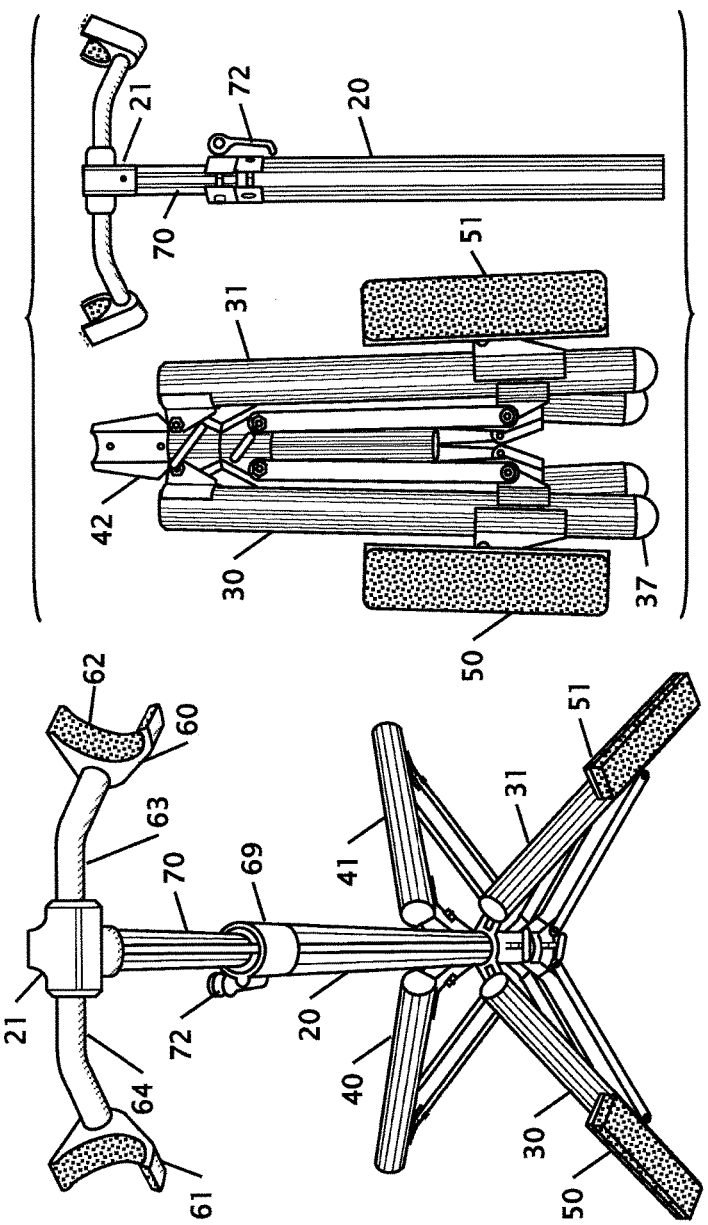

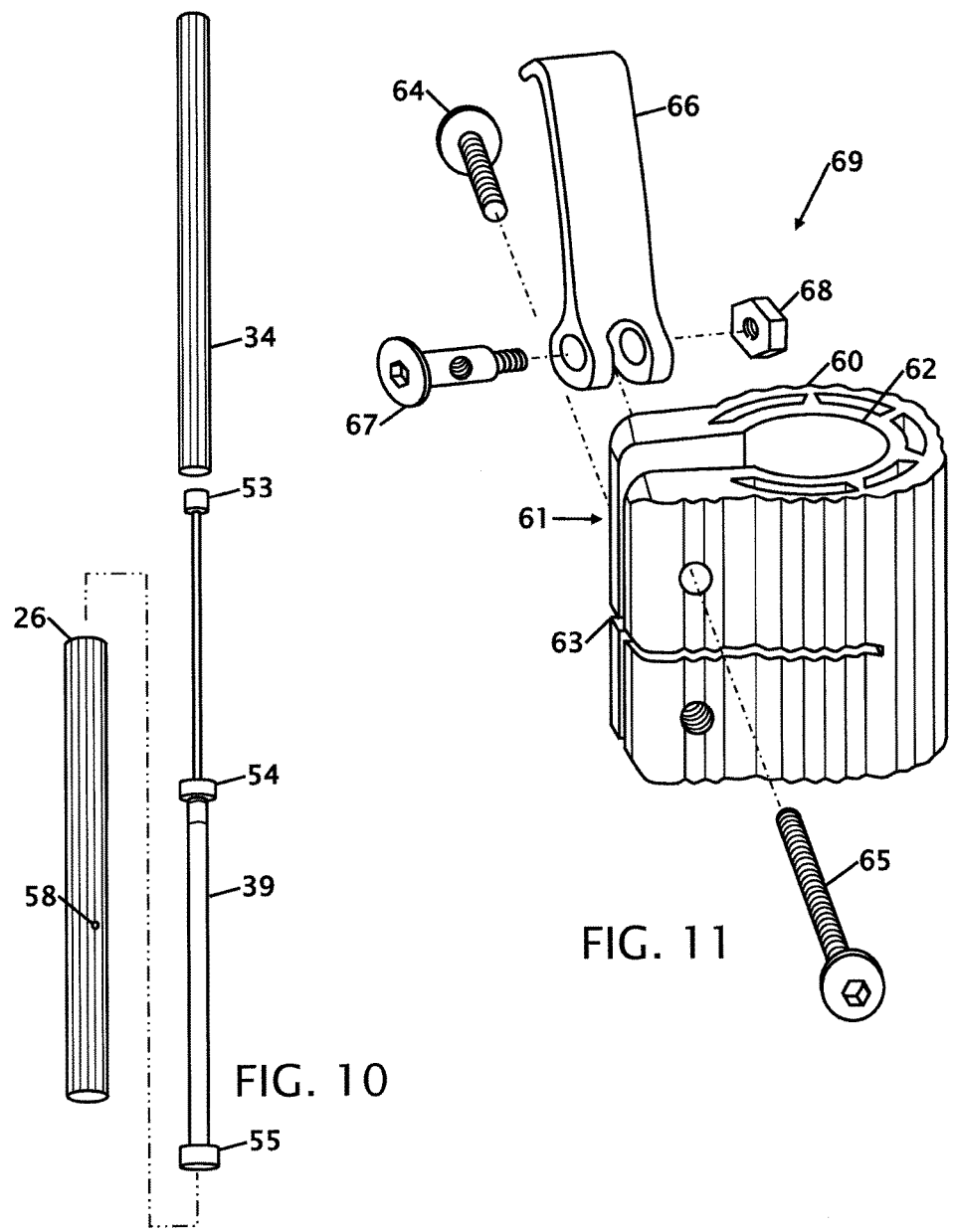

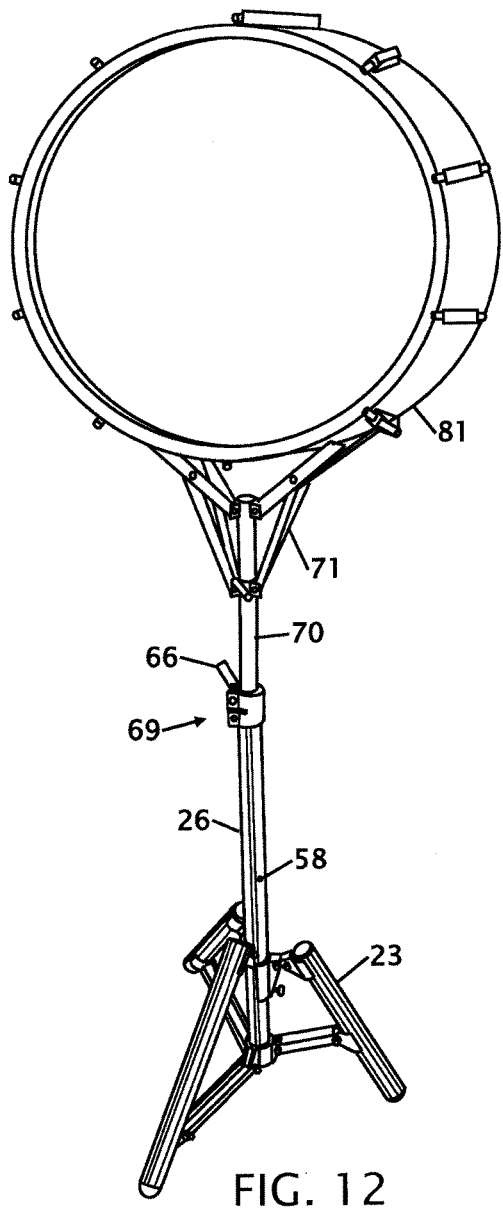
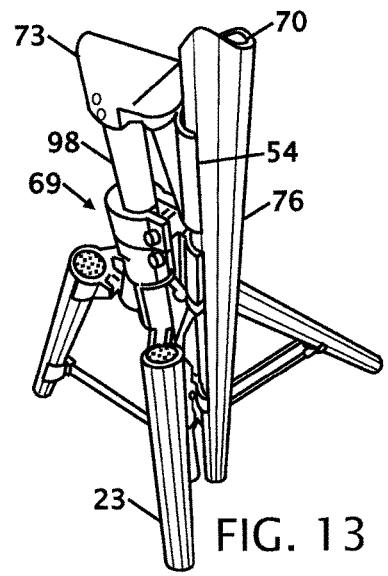
FIG. 13
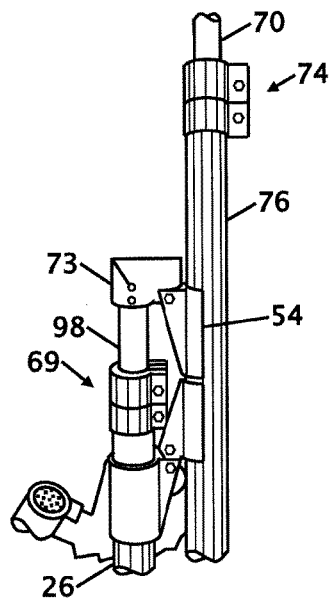
FIG. 12
FIG. 14

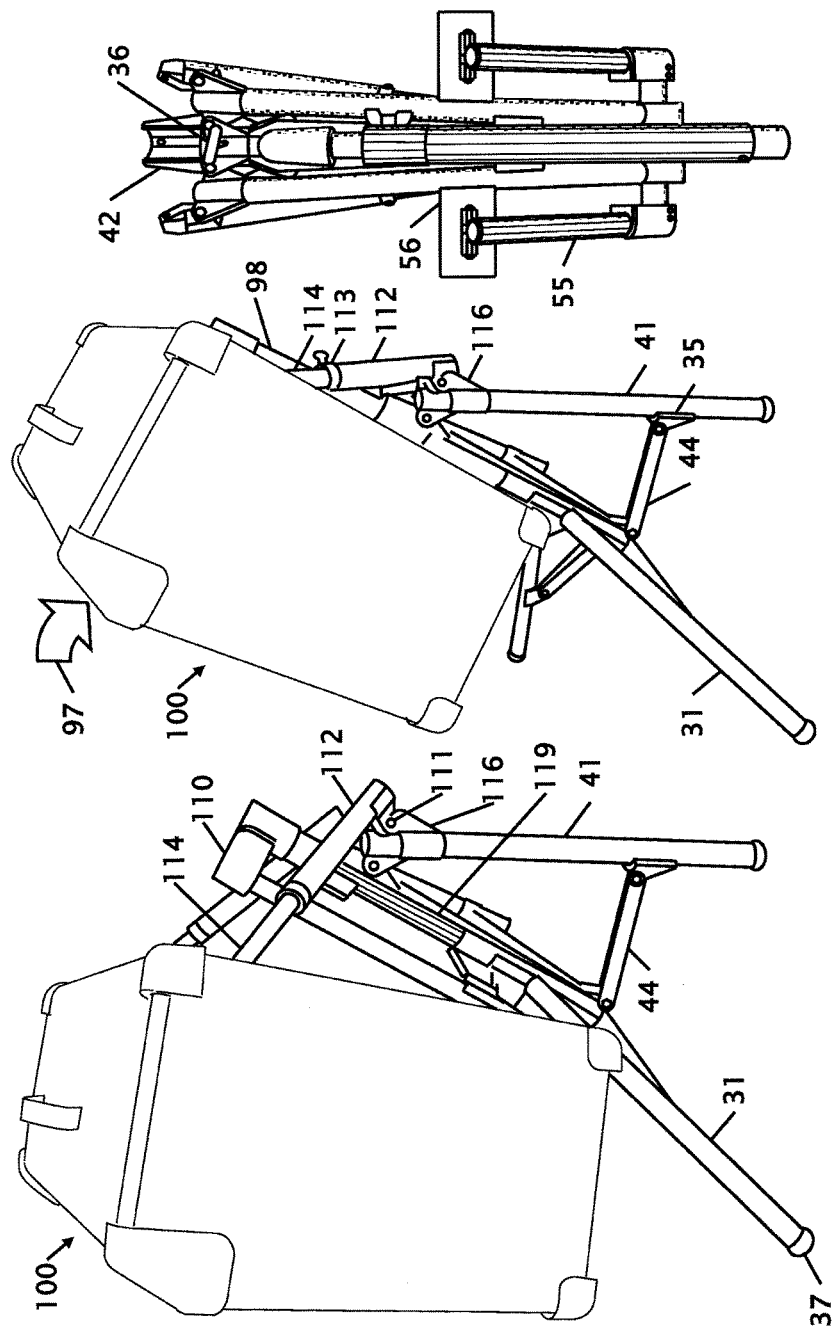

MECHANICAL ASSIST EQUIPMENT SUPPORT STAND

CROSS REFERENCE TO RELATED APPLICATION

This application is a continuation of U.S. patent application Ser. No. 15/169,147, filed May 31, 2016, which is a continuation of U.S. patent application Ser. No. 14/598,162, filed on Jan. 15, 2015, now U.S. Pat. No. 9,377,158, which claims priority to provisional application 61/927,863 filed on Jan. 15, 2014, the entire contents of which is hereby expressly incorporated by reference herein.

BACKGROUND OF THE INVENTION

This invention relates to improvements in an instrument, speaker and amplifier lift stand. More particularly, the present stand is a collapsible stand that rigidly supports instruments, speakers and amplifier. The lift stand also functions to elevate a speaker with the collapsible stand. The stand supports all or the majority of the weight of the instrument or speaker in a static position to relieve the performer or technician of the weight of the musical instrument or speaker. The stand can articulate an amplifier to adjust the direction of the sound or access to the controls.

Several products and patents have been. Exemplary examples of patents covering these products are disclosed herein. Musical instrument stands are desirable for supporting various articles and instruments since they provide selective height adjustment and a stable support. They are particularly useful is supporting such things as cameras, video equipment, telescopes, surveying instruments, and musical instruments. Musical instrument stands for brass instruments, however, raise special problems when used on steps or stairs of an auditorium or stadium.

There are several patents that describe various adjustable musical instrument stand devices. Bruneau U.S. Pat. No. 1,517,825 shows a tripod support for a table having adjustable legs.

This invention is an improvement over the inventor's, May, U.S. Pat. No. 5,072,910. The US patent office has issued several musical instrument stands to May that disclose and provide support for musical instruments namely U.S. Pat. Nos. 7,438,266, 7,588,228, 7,703,725 and 7,718,878. It is distinguished over the prior art in general, and these patents in particular by an adjustable musical instrument stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another. One leg of the musical instrument is adjustable in length, a sufficient amount, to permit support on two different stairs or steps of an auditorium or stadium.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a musical instrument type support for supporting the instrument in a reference position.

When the upper leg supporting collar and the corresponding lower collar are moved toward each other on the upright portion, the bottom of the leg connected thereto will be extended radially outward to be positioned an unequal distance from the center of the upright portion relative to the other legs, and the upper leg supporting collar and the corresponding lower collar are moved away from each other, the bottom of the leg connected thereto will be drawn radially inward to be positioned an unequal distance from the center of the upright portion relative to the other legs. The one adjustable leg of the musical instrument allows the stand to be erected on multi-level surfaces.

Various objects, features, aspects, and advantages of the present invention will become more apparent from the following detailed description of preferred embodiments of the invention, along with the accompanying drawings in which like numerals represent like components.

BRIEF SUMMARY OF THE INVENTION

It is therefore an object of the present stand to provide an adjustable musical instrument stand that has independently adjustable movable legs.

It is another object of this stand to provide an adjustable musical instrument stand that allows for multiple angularities and musical instrument configurations.

Another object of this invention is to provide a stand that has two or more independently adjustable movable legs providing versatility and stability in the support system.

Another object of this stand is to provide an adjustable musical instrument stand that allows for the body of the stand to be oriented in an off-axis position while maintaining the center of gravity in a stable support system.

Another object of the stand is to allow collars that support the legs, to be slidably adjusted past each other to allow for a greater variety of adjustment.

Another object of the stand is to provide an adjustable support leg positioned on the musical instrument stand and under a musical instrument to provide additional support to the musical instrument while it is being played.

Another object of the stand is to provide a spring or gas charged strut within the musical instrument stand that assists in the extension of telescoping members.

Another object of the stand is to provide additional extension legs that can be used in combination with the legs of the musical instrument stand to give greater extension capability for placement of the musical instrument stand on uneven surfaces.

Another object of the stand is for the geometry of the center tube and the legs to be essentially the same to allow for part commonality and interchangeability.

Another object of the stand is to allow the position of the leg brace to be adjustable to allow the angular arc or position of the leg to be adjusted beyond a single fixed fulcrum brace point.

It is another object of this stand is to provide an adjustable musical instrument stand for supporting articles which is simple in construction, light-weight, economical to manufacture, rugged and reliable in use.

It is another object of the present stand to provide an expandable musical instrument stand made from extruded sections where the extruded sections include a dovetail feature that allows the extruded tubular sections to be locked together.

It is another object of this stand to utilize dovetail locking features to engage tubular sections and allow the stand to become longer. The leg section creates both the leg support and the locking mechanism for the additional tubular extension.

It is another object of this stand to allow the overall height of the instrument stand significantly reduced make the stand easier to transport and store, the long center tube support can be split into two or more pieces and assembled using an existing leg clamp to secure the two center tube sections rigidly together.

It is another object of this stand is to provide an adjustable tripod stand that has two or more independently adjustable movable legs providing versatility and stability in the support system.

It is another object of this stand is to provide an adjustable tripod stand that allows for the body of the stand to be oriented in a greater off-axis position while maintaining the center of gravity in a stable support system.

It is another object of the stand is to allow collars that support the legs, to be slidably adjusted past each other to allow for a greater variety of adjustment.

It is another object of the stand to support an amplifier and allows the amplifier to articulate and be locked between approximately 0 degree and 45 degree positions. These positions allow a performer to set the amplifier at the desired angle for optimal sound and access to the amplifier controls.

It is still another object of the stand to utilize an assisted lifting mechanism, such as a spring or gas strut, to make adjusting the height of the playing surface of the musical instrument easier. The assisted lifting mechanism allows for an infinite number of heights that the instrument can be adjusted and the adjustment can be made quickly by a performer. Various lifting mechanisms can be used based upon the required force and the amount of extension that is required.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 3 shows a front perspective view of the sousaphone stand on a stadium stand supporting a sousaphone.

FIG. 4 shows a side perspective view of the sousaphone stand.

FIG. 8 shows a top perspective view of the sousaphone stand.

FIG. 9 shows the collapsed pieces of the sousaphone stand ready for transportation.

FIG. 10 is an exploded view of the extension mechanism.

FIG. 11 is an exploded view of the clamping mechanism for the extension lift mechanism.

FIG. 12 is an isometric view of the extendable tripod stand with a vertically mounted bass drum.

FIG. 13 shows a top perspective view of a compound lift mechanism.

FIG. 14 shows a detailed view of a compound lift mechanism.

FIG. 19 shows a side view of the amplifier stand at an approximately 0 degree angle.

FIG. 20 shows a side view of the amplifier stand at an approximately 45 degree angle.

FIG. 21 shows a view of the amplifier stand in a collapsed configuration.

DETAILED DESCRIPTION OF THE INVENTION

Figure 1:
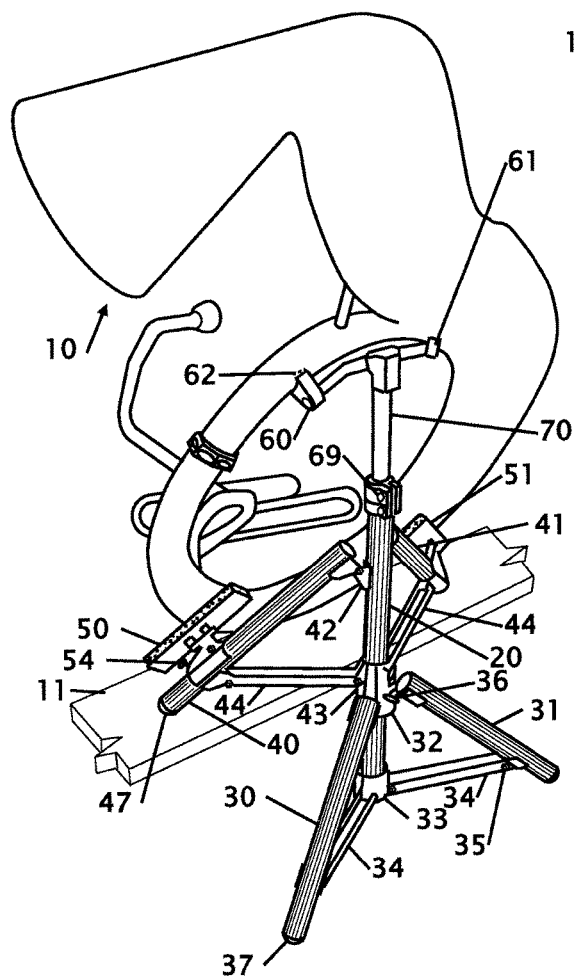
FIG. 1 shows a back isometric view of the sousaphone stand on a stadium stand supporting a sousaphone.
Figure 2:
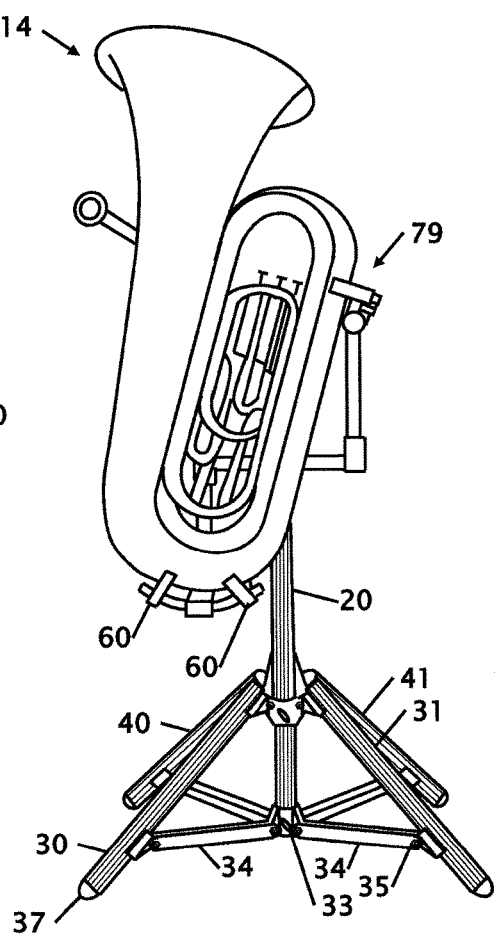
FIG. 2 shows a front perspective view of a tuba mounted in the stadium stand.

FIG. 1 shows a back isometric view of the sousaphone stand on a stadium stand supporting a sousaphone. FIG. 2 shows a front perspective view of a tuba mounted in the stadium stand. FIG. 3 shows a front perspective view of the sousaphone stand on a stadium stand supporting a sousaphone and FIG. 4 shows a side perspective view of the sousaphone stand. From FIG. 1 a sousaphone 10 is shown resting upon the stand. The stand has two sets of legs, 30, 31 and 40, 41 that are configured to slide on a central tube 20. The two sets of legs are independently connected to the central tube 20 to allow the legs to be placed on different elevations whereby allowing the first set of legs 30, 31 to be placed on the ground and the second set of legs to be placed on a bench seat 11 or similar raised platform that might be found in a stadium. While in some of the figures the legs are shown at different elevations they may also be placed on the same elevation or slightly offset in elevation to prone the stand in an off axis orientation.

The sousaphone is placed on the stand where the upper curved tube of the sousaphone 10 rests in the cradle of the arc sector or "V" receivers 60 and 61 that are covered with padding 62 to cushion the sousaphone 10. The padding can be a variety of different materials including but not limited to felt, cloth, rubbers, plastics or elastomeric. The arc padded sectors 60 and 61 are connected to a head 21 with arms 63 and 64. While arc sector or "V" receivers are shown in FIGS. 1 to 3, the head may be replaced with an elbow 73 that is connected to a single clamp as shown and described in FIGS. 4 to 5. The cantilevered weight of the sousaphone 10 naturally rotates the sousaphone 10 in the arc sector or "V" receivers 60 and 61 such that the lower portion of the sousaphone 10 rests on pads 50 and 51.

The pads 50 and 51 are pivotable on pivot pads 52 and 53 and can slide 54 on a second set of legs 40 and 41 to allow the pads 50 and 51 to be placed at a location that provides protection of the instrument. The pivoting and sliding of the pads 52 and 53 allows for player customization to accommodate placement of the pads 52 and 53.

The first set of legs 30 and 31 are slidably connected to the central tube 20 with two independent dovetail tubular first upper collar slider 32 and first lower collar slider 33. The first upper collar slider 32 is pivotably 35 connected to one end of each leg 30 and 31, while the first lower collar slider 33 is pivotably 35 connected to leg brace(s) 34 that are then slidably 38 and pivotably 35 connected to an opposing end of each leg 30 and 31. A tension screw 36 on each first upper and lower collar slider 32 and 33 secures each slider on the central tube 20. The lower end of each leg 30 and 31 has a foot pad 37 to protect the surface where the stand is placed upon.

The second set of legs 40 and 41 are slidably connected to the central tube 20 with two independent dovetail tubular second upper collar slider 42 and second lower collar slider 43. The second upper collar slider 42 is pivotably 45 connected to one end of each leg 40 and 41, while the second lower collar slider 43 is pivotably 45 connected to leg brace(s) 44 that are then slidably 48 and pivotably 45 connected to an opposing end of each leg 40 and 41 . A tension screw 46 on each first upper and lower collar slider 42 and 43 secures each slider on the central tube 20. The lower end of each leg 40 and 41 has a foot pad 47 to protect the surface where the stand is placed upon.

The collar sliders 32, 33, 38, 42, 43, and 48 are configured with reverse facing dovetail edges having a wrap angle of less than 180 degrees of wrap on the central tube and the legs 30, 31 , 40 and 41 that allows the collar sliders to slide past each other on the central tube 20 and or the legs 30, 31 , 40 and 41. In addition, because both the upper and lower collar sliders are independent, the angle of the leg 32, 33, 42 and 43 and or leg more brace(s) 34 and 44 are adjustable to alter the distance between the foot pads 37, 47 and the central tube 20.

The central tube 20 has an internal extension tube 70 that can be adjusted in extension to raise or lower the height of the arc sector or "V" receiver 60, 61 pads 62. The extension tube 70 can further be removed, as shown in FIG. 9, for storage or transportation. The extension tube is securable in position on the central tube 20 with a tube clamp 69 that operates with a cam 72 on a lever to allow for quick clamping and releasing of the extension tube 70.

Figure 5:
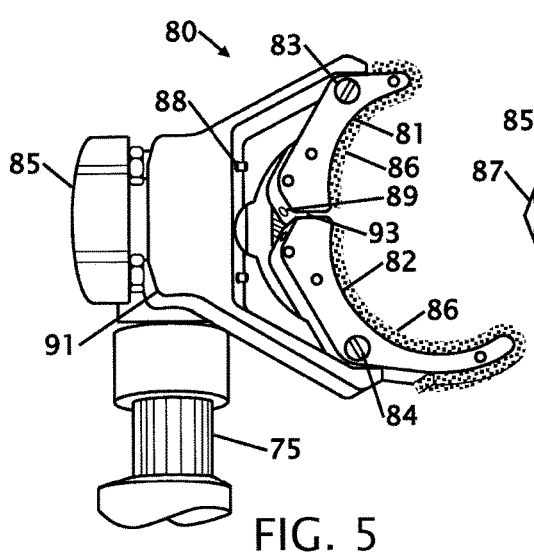
FIG. 5 shows a tubular clamp in an open configuration.
Figure 6:
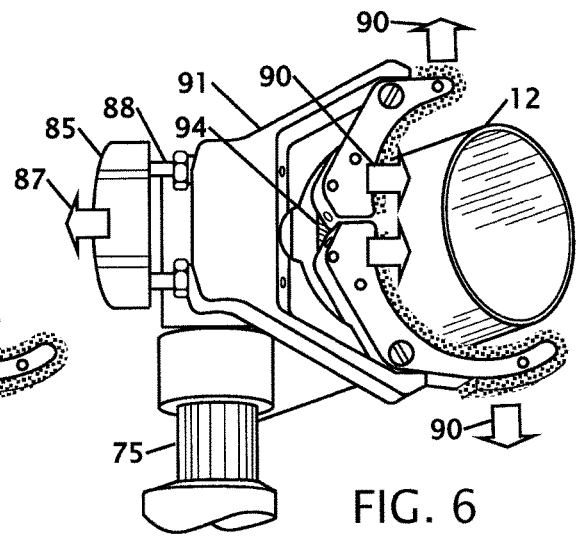
FIG. 6 shows the tubular clamp from FIG. 4 receiving a tube.
Figure 7:
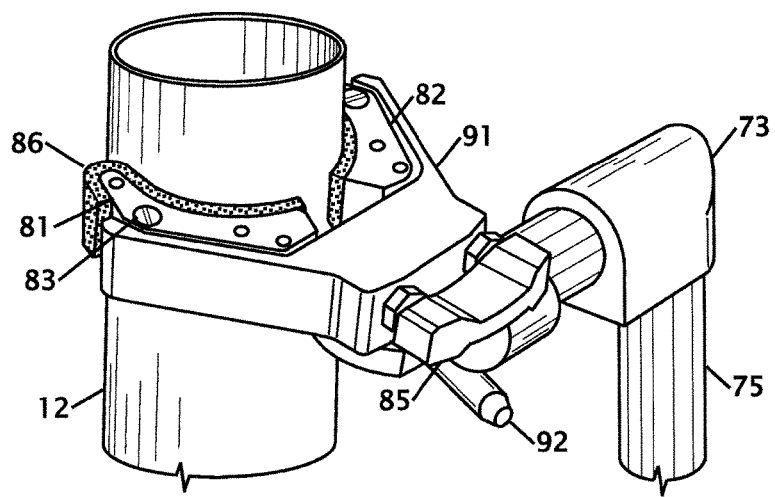
FIG. 7 shows a perspective view of the tubular clamp from FIGS. 4 and 5 grasping a tube.

In FIG. 2, the bottom of the tuba 14 is placed onto the arc sector or "V" receivers 60 and the tube of the tuba 14 is secured in clamp 80. FIGS. 5 to 7 show and describe the clamp in greater detail.

FIG. 5 shows a tubular clamp in an open configuration, FIG. 6 shows the tubular clamp 80 from FIG. 4 receiving a tube and FIG. 7 shows a perspective view of the tubular clamp 80 from FIGS. 4 and 5 grasping a tube. This clamp 80 can be placed on the extension tube 70 to grasp the tube 12 of a musical instrument. The riser tube 75 is held with elbow 73 in position on the instrument stand. The position of the tubular clamp on the stand is adjustable and secured with screw clamp 92.

The tubular clamp 80 has a first arc sector or "V" receiver 81 and a second arc sector or "V" receiver 82 that grasps at least partially around the tube 12 of a musical instrument. The first arc sector or "V" receiver 81 pivots on a pivot axis 83 while the second arc sector or "V" receiver 82 pivots on a pivot axis 84 that extends through the body 91 of the tubular clamp 80. The inside edges 93 limits the amount that the arc sector or "V" receivers will open. Each arc sector or "V" receiver 81 and 82 is padded or cushioned 86 to both frictionally grip the instrument tube 12 and to prevent damage to the instrument tube 12. When the instrument tube is pushed into the tubular clap 80 the arc sector or "V" receivers 81 and 82 will pivot until holes 89 engage into pins 88 that will hold the arc sector or "V" receivers 81 and 82 in a closed orientation as shown in FIG. 7. When release 85 is pulled back 87 the pins 88 will be pulled out of retentions holes 89 whereby releasing the arc sector or "V" receivers 81 and 82 and spring 94 will pull 90 the arc sector or "V" receivers 81 and 82 open to release the tube 12.

FIG. 8 shows a top perspective view of the sousaphone stand that is shown in FIGS. 1-4. This orientation of the stand represents the orientation where a performer will place the sousaphone into the stand. Because of the weight and cost of a sousaphone performers must often support the weight of the instrument by placing the instrument on their legs as they rest on the stadium. Using this instrument stand, a performer can place the instrument stand in a stadium and adjust the height of legs 30, 31 and 40, 41 to accommodate the geometry of the stadium seat or bleacher. The performer will loosen the cam clamp 72 to raise or lower the extension tube 70 from the central tube 20 and then tighten the tube clamp. The performer will then rest the upper tube of the sousaphone in the pads 62 of the arc sector or "V" receivers 60 and 61 that exist on the ends of arms 63, 64 from head 21. The sousaphone will then naturally rotate onto pads 50 and 51 that can also be adjustable on legs 30 and 31 to cushion the sousaphone. It is contemplated that to assist in positioning the extension tube 70 that a spring, gas filled strut or other similar lifting mechanism are can be incorporated into the central tube 20 to assist a performer to extend the extension tube 70 out of the center tube 20 as shown and described in FIG. 10.

FIG. 9 shows the collapsed pieces of the sousaphone stand ready for transportation. In this figure the central tube 20 including the cam clamp 72, extension tube 70, head 21 and the padded arc sector or "V" receiver musical instrument supports are separated from the leg assemblies. The leg assemblies will include the first leg set 30, 31, sliders and foot pads 37. The leg assemblies also include the second leg set that are partially visible behind the first leg set 30, 31. The pads 50 and 51 are shown rotated against the pivoting sliders to minimize storage size. The slide collar 42 is shown removed from the central tube 20. While FIG. 9 shows the sousaphone stand, the tuba stand is disassembled in a similar manner.

Referring now to FIG. 10 that shows an exploded view of the extension mechanism 39. The extension/lift mechanism can be a variety of different mechanism. In FIG. 6 it is shown as a compression spring. In this figure the lift/extension mechanism is shown and described as a strut. The strut shown is a gas filled extension mechanism that naturally exists in an extended orientation. Pushing upon the two ends will compress the strut. Various different forces and extension lengths are available. When using the strut in the embodiments shown, the strut must be stopped med stroke at the length desired by the user. One contemplated embodiment of the clamping mechanism is shown and described in FIG. 12.

The strut 39 has end caps 53 and 55 that are installed with the tubes 34 and 26. A set screw or stops 51 and 58 retain the end caps 53 and 55 within the tubes 34 and 26. In one embodiment the end caps sit on the screws 51 and 58. In another embodiment the screws 51 and 58 bind the end caps 53 and 55 to prevent the inner tube 34 from being accidentally removed from the outer tube 26. A guide 54 exists in the middle of the strut 39 to reduce axial loading on the strut that could harm the seals of the strut 39. The extension mechanism can be either inserted into the inner tube 34 or in the outer tube 26. A securing means for securing a musical instrument is attached to the end of the upper tube 34. The instrument securing means allows a performer to install a musical instrument such as a drum or other musical instrument onto the stand. Various types of percussion musical instruments are shown in the figures. In this figure the securing means is a saddle 62 where a musical instrument is placed vertically into the securing means 60.

FIG. 11 is an exploded view of the clamping mechanism 69. Referring briefly to FIGS. 1, 3, 4, 8 and 9 the clamping mechanism 69 is shown where the lower tube 26 and the upper tube 34 intersect. The clamping mechanism is an extrusion 60 with a central hole 62 where the lower portion of the clamping mechanism 69 is secured to the lower or outer diameter tube 26. The clamping mechanism is partially split into a lower portion that is secured to the lower tube 26 (not shown) and an upper section that can temporally hold the upper tube 34 (not shown) the split 63 separates these two section and allows separate flexibility for clamping the upper and lower parts of the clamping mechanism 69. A screw 64 closes the lower portion of the clamping mechanism 69 on the lower tube. A separate screw 65 passes through the upper portion of the clamping mechanism 69 where it is threaded into as shoulder bolt 67 with a threaded hole that the screw 65 threads into. A nut 68 retains the shoulder bolt 67 on a cam arm. The cam arm 66 has an eccentric hole that allows the upper portion of the clamping apparatus/griping means to close the gap 61 onto an upper tube to prevent extension of the upper tube 34 (not shown).

In FIG. 12 the extendable stand is mounted with a vertically mounted on a bass drum. In each of the configurations the drum can be quickly removed from a performer's body mounted carrier and installed onto the adjustable stand. In all of these configurations the base or legs 23 extend from the lower central tube 26. The extension mechanism exists inside one of the tubes where it is secured or located with screws 58 and or 51. In all of these figures the upper tube 34 is shown partially pushed out of the lower tube 26. The amount of extension of the upper tube 34 out of the lower tube 26 is determined by the performer preference and an infinite number of different heights are adjustable. The force and extension length of the extension mechanism is variable based upon the type and weight of instrument that is being supported. In the preferred embodiment the force of the extension mechanism is selected to allow for minimal force by the user to raise or lower the musical instrument 79 and the weight of the musical instrument is sufficient to approximately equal the force from the extension mechanism.

The strut can be fixed to the stand, or can be changeable. The clamping apparatus/griping means 69 grips the upper tube to prevent undesirable movement of the upper tube 70 while a performer is performing. The location of the tube 70 is quickly adjustable with the eccentric cam arm 66. A securing means for securing a musical instrument 81 is attached to the end of the upper tube 70. The instrument securing means 81 allows a performer to install a musical instrument 81 such as a drum or other musical instrument onto the stand. In some cases a support brace or bracket 71 is used to reduce the moment arm of the musical instrument on the stand. In the figures a further support arm 71 extends from the brace or bracket 70 to the drums 81 that is mounted.

The inventor of this disclosure has also been awarded U.S. Pat. Nos. 7,438,266, 7,588,228, 7,703,725 and 7,718,878 that may disclose tripod type stands. It is distinguished over the prior art in general, and these patents in particular by an adjustable musical instrument stand with independently adjustable legs 23 which comprises a longitudinal extensible upright portion 26 of telescoping tubular members, a plurality of collar members 69 slidably mounted on the upright portion 26 which are longitudinally adjustable relative to one another and to the upright portion 26 for selective positioning. The lift mechanism further creates additional improvement and user performance features that were not obvious and are novel over the inventors' prior patents.

Figure 15:
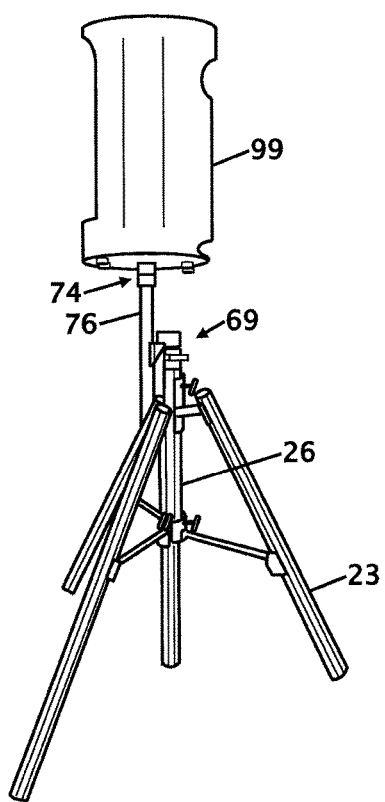
FIG. 15 shows a perspective view of the compound lift in a retracted condition with a top mounted speaker.
Figure 16:
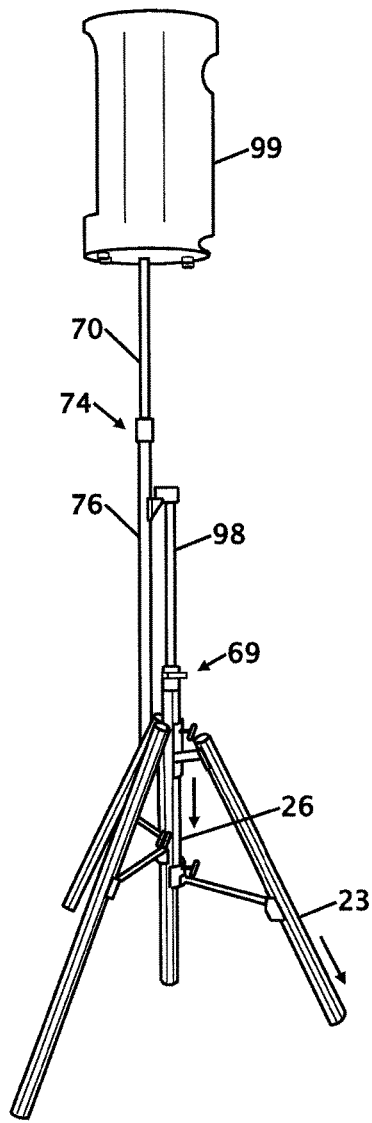
FIG. 16 shows a perspective view of the compound lift in an extended condition with a top mounted speaker.

FIG. 13 shows a top perspective view of a compound lift mechanism, FIG. 14 shows a detailed view of a compound lift mechanism, FIG. 15 shows a perspective view of the compound lift in a retracted condition with a top mounted speaker, and FIG. 16 shows a perspective view of the compound lift in an extended condition with a top mounted speaker. In FIGS. 13 and 14 a second or compound lift member 76 is mounted aside the lower central tube 26. The parallel structure of the lower central tube with the compound lift member 76 provides additional stability when the parallel members are clamped. Releasing the lower clamping mechanism 69 allows the internal extension/lift mechanism rod 98, as shown and described in FIG. 10, pushes upon connecting elbow 73 to extend as the guides 54 slide along the outrigger lift tube 76. A second extension/lift mechanism 70 is exists within the outrigger lift tube 76 to provide a second lift to further extend the lift height of the stand by releasing upper clamping mechanism 74.

In FIG. 15 a speaker 99 is mounted to the top of the stand and shown in a lowered condition. In FIG. 16 one of the legs 23 is shown slightly displaced to show an adjustment for placement of the stand on an uneven surface. FIG. 16 also shows the speaker more fully elevated with both the first stage extension tube 98 and the second stage extension tube 70 released and extended. Once the tubes are extended to the desired extension, clamps 68 and 74 are secured. These clamps 68 and 74 are shown and described in more detail with FIG. 11 herein.

Figure 17:
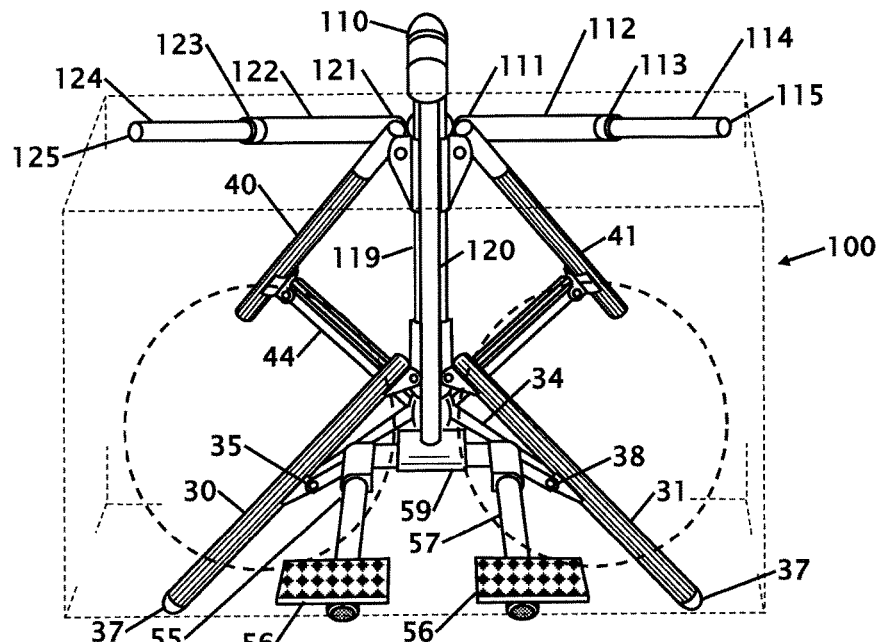
FIG. 17 shows an elevated front view of the amplifier stand.
Figure 18:
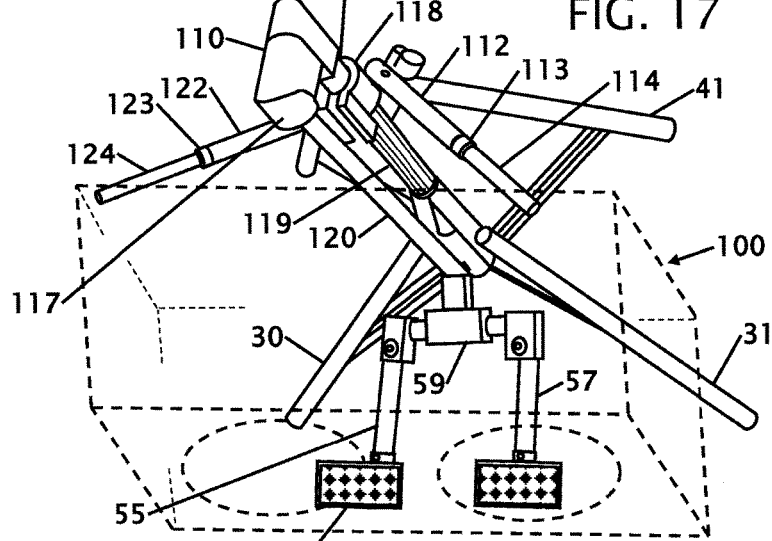
FIG. 18 shows an upper front perspective view of the amplifier stand.

FIG. 17 shows an elevated front view of the amplifier stand, and FIG. 18 shows an upper front perspective view of the amplifier stand. The base of the amplifier stand is essentially the same four legged structure shown and described in the previous figures where there are two front supporting legs 30, 31 and two separate supporting legs 40, 41. The legs are supported through sliding supporting brackets 35, 38 and support arms 34, 44. The legs slide and are supported on a rear central tube 119 that is connected to a front tube 120. In addition to the supporting legs, two supporting arms are pivotable connected 111, 121 to the stand.

The right arm, sections 112 and 114 are connected 111 on one side while left arm sections 122 and 124 are connected 121 on the opposing side of the rear central front tube 119. The ends of the arms 115 and 125 contact and support the rear of the amplifier 100. The length of the arms are individually adjustable with locking members 113 and 123. The bottom of the amplifier 100 is supported on pads 56 that extend from arms 57 and connector 59 that is supported on the front tube 120. A mechanical lift or extension mechanism is located within the rear central tube 119. The height of the pivoting location 111 and 112 of the left 122/124 and right arm 112/114 sections is essentially fixed, based upon the height of the collar 118. The tube 98 extends from the collar 118 position.

As the lift mechanism lifts the tube 98 the head 110 is also moved along with the front tube that moves the supporting pads 56. As the supporting pads 56 are raised, the position of the pads 56, relative to the fixed position of the collar 118, forces the amplifier 100 to rotate from an initial 0 degree to a final approximately 45 degree position. The amplifier 100 can be stopped at any desired position between 0 and 45 degrees. While 0 and 45 degrees are specifically identified in this disclosure, greater and lesser angles are contemplated. This articulation is shows and described in more detail in other figures shown in this disclosure. The back of the speaker can rest on a rear supporting feature 117 where the speaker is supported on the supporting pads 56 and on the rear supporting feature 117 that can be a pad or cushion that lifts with the front tube 120. The angle of the speaker is altered by changing the position of the legs on the central tube 119.

FIG. 19 shows a side view of the amplifier stand at an approximately 0 degree angle and FIG. 20 shows a side view of the amplifier stand at an approximately 45 degree angle. From these two figures it is shown that as the tube 98 extends the lift from the bottom of the amplifier 100 causes the (fixed length) arms 112, 114 to pivot at 111 on slider 116 to alter the angle of the amplifier 100 on the stand.

FIG. 21 shows a view of the amplifier stand in a collapsed configuration to allow the stand to be stored or transported in a smaller configuration. Essentially the legs and supports arms fold inward thereby providing a smaller packaged size.

Thus, specific embodiments of a stand have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A stand, comprising:
    a standing base frame;
    an equipment support supported by the base frame, wherein the equipment support is configured to support the weight of supported equipment from an underneath position relative to at least a portion of the supported equipment;
    an extender coupled to the base frame at a lower end of the extender and to the equipment support at an upper end of the extender, the extender configured to elongate so as to thereby provide an upward mechanical assistance force that at least partially absorbs the weight of the supported equipment supported by the equipment support and thereby assist with an adjustment of the height of the equipment support relative to the standing base frame; and
    one or more auxiliary supporting structures that are vertically adjustable relative to the base frame to change a supporting angle of the supported equipment relative to the stand.

2. The stand of claim 1, wherein the equipment support comprises:
    at least one arm adjustable to change a supporting angle at which equipment is supported by the equipment support.

3. The stand of claim 2, wherein the extender is configured to simultaneously adjust an angle and a height of equipment supported by the equipment support relative to the standing base frame.

4. The stand of claim 3, wherein the length, height and/or angle of the at least one arm relative to the standing base frame is adjustable.

5. The stand of claim 4, wherein the standing base frame comprises:
    at least one set of legs, wherein the height of the legs relative to the standing base frame is adjustable.

6. The stand of claim 5, wherein said extender comprises at least one of: a gas filled strut and a spring.

7. The stand of claim 1, wherein the extender is configured to simultaneously adjust an angle and a height of equipment supported by the equipment support relative to the standing base frame.

8. The stand of claim 7, wherein the length, height and/or angle of the at least one arm relative to the standing base frame is adjustable.

9. The stand of claim 8, wherein the standing base frame comprises:
    at least one set of legs, wherein the height of the legs relative to the standing base frame is adjustable.

10. The stand of claim 9, wherein said extender comprises at least one of: a gas filled strut and a spring.

11. The stand of claim 1, wherein the length, height and/or angle of the at least one arm relative to the standing base frame is adjustable.

12. The stand of claim 11, wherein the standing base frame comprises:
    at least one set of legs, wherein the height of the legs relative to the standing base frame is adjustable.

13. The stand of claim 2, wherein said extender comprises at least one of: a gas filled strut and a spring.

14. The stand of claim 1, wherein the standing base frame comprises:
    at least one set of legs, wherein the height of the legs relative to the standing base frame is adjustable.

15. The stand of claim 14, wherein said extender comprises at least one of: a gas filled strut and a spring.

16. The stand of claim 1, wherein said extender comprises at least one of: a gas filled strut and a spring.

* * * * *